United States Patent [19]

Bartholomew

[11] Patent Number: 4,836,679
[45] Date of Patent: Jun. 6, 1989

[54] ROTATION SENSORS BASED ON SYMMETRICAL ELECTRO-MAGNETIC OSCILLATORS

[75] Inventor: Bruce J. Bartholomew, Poway, Calif.

[73] Assignee: General Dynamics Corporation, San Diego, Calif.

[21] Appl. No.: 194,604

[22] Filed: May 16, 1988

[51] Int. Cl.$^4$ .................. G01C 19/58; G01C 19/64
[52] U.S. Cl. .................................... 356/364; 356/366; 372/18
[58] Field of Search .................... 356/364, 366, 367; 372/18

[56] References Cited

U.S. PATENT DOCUMENTS 3,514,207  5/1970  De Lang et al. .................. 356/367
3,778,163  12/1973  Forward .......................... 356/366

Primary Examiner—Vincent P. McGraw
Attorney, Agent, or Firm—John R. Duncan; Frank D. Gilliam

[57] ABSTRACT

The invention is directed to a measurement of rotation of a body with respect to a fixed inertial coordinate system by use of an oscillator that is rotationally symmetrical about one axis, a locking oscillator for injecting locking the rotationally symmetric oscillator to a selected frequency and state of polarization and measuring the polarized orientation of the oscillator with a polarization detector.

5 Claims, 1 Drawing Sheet

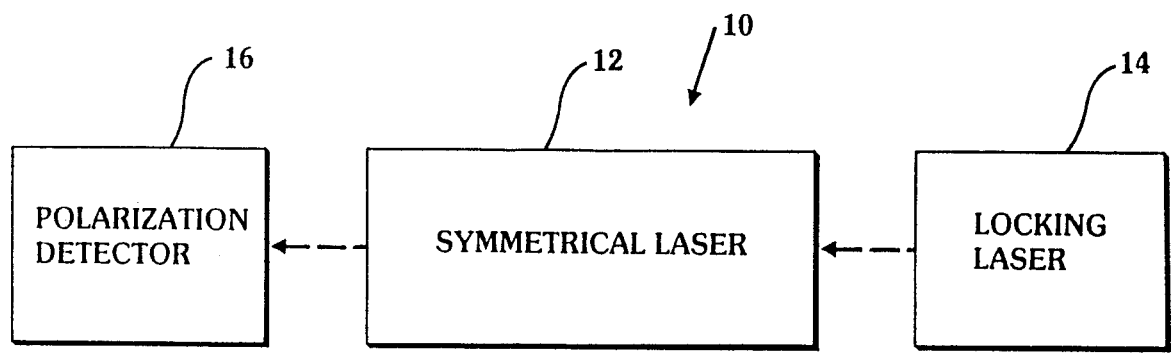

ROTATION SENSORS BASED ON SYMMETRICAL ELECTRO-MAGNETIC OSCILLATORS

BACKGROUND OF THE INVENTION

The invention is directed to gyroscopes and more particularly to a system for measuring rotation of a body with respect to a fixed inertial coordinate system.

U.S. Pat. No. 3,514,207 issued to inventor H. De Lang et al. teaches a laser with no preferred direction of polarization for detecing the motion of an object. The Patent does not teach rotational measurement of any object relative to inertial space. The patent is silent as to initiating an asymmetric mode in the laser to perform inertial measurements.

U.S. Pat. No. 3,778,163 issued to inventor Robert L. Forward teaches inertial rotation by determining the change in the polarization direction of a light beam between the time of emission and detection. Although this system operates, it is not practical because the path length requirements are very long for the required high sensitivity for accurate measurements.

There is a continuing need for an accurate and relatively inexpensive system for measuring rotation of a body in space. The present invention satisfy these needed requirements.

SUMMARY OF THE INVENTION

The invention is directed to an improved system for measuring the rotation of an object in space by inertial means.

The laser of the U.S. Pat. No. 3,514,207 patent can be used as the symmetrical oscillator of this invention. The present invention overcomes the limitations of the U.S. Pat. No. 3,778,163 patent by sensing inertial rotation independent of the optical path length.

The present invention uses an oscillator that is rotationally symmetric about an axes, such as a laser oscillator aforementioned. The rotation of the device of the invention is measured by establishing a mode of oscillation of the symmetric oscillator by the use of a locking oscillator (laser) and then monitoring the orientation of the mode with respect to the device. The monitoring is accomplished by means of a polarization device after the locking oscillator is turned off. The principle is the same as that governing the Foucault pendulum. The polarization mode is stable in inertial space whereas the plane of the polarization is stable in the Foucault pendulum.

It is an object of this invention to provide a system for making rotational measurement in inertial space by the use of an axes symmetrical oscillator, a locking oscillator and a detection means.

It is another object of this invention to provide a system for making rotational inertial measurements in space by the use of electro-magnetic oscillators and detectors.

Yet other objects of the invention include no sensitivity to acceleration, rapid warm up, high accuracy, small size and potentially low cost.

The foregoing and other objects, features and advantages of the invention will become apparent from the following and more particular description of the preferred embodiment of the invention, as illustrated in the accompanying drawings.

BRIEF DESCRIPTION OF THE DRAWING FIGURE

The single drawing FIGURE depicts a block diagram showing the positional relationship of the locking and symmetrical laser and the polarization detector of the invention.

DETAILED DESCRIPTION OF PREFERRED EMBODIMENT

The basic principles of the present invention is to perform the function of a gyroscope by the use of an oscillator that is rotationally symmetric about an axis to measure rotation inertial space about the axis of symmetry. The rotation of the device is meausred by establishing a mode of oscillation that does not change with respect to the fixed coordinate axes of inertial space and then monitoring the orientation of the mode with respect to the device. The principal of operation of this invention is the same as that governing the Foucault pendulum.

As shown in the single block diagram FIGURE, for the rotation sensor 10 of the present invention utilizes a symmetrical oscillator 12, a locking oscillator 14 and a polarization detector 16.

The symmetry oscillator 12 may be any oscillator operating in any part of the electro-magnet spectrum that has the required symmetry, detecting and locking characteristics. Oscillators having these characteristics include, but are not limited to, lasers, masers, etc. and any other devices suitable for the purpose intended.

The locking oscillator 14, by way of example, and not by way of limitation, may be a single mode laser, or any other locking type oscillator having the same or similar characteristics as the aforementioned example.

The polarization detector 16, by way of example, and not by way of limitation, may be a fixed polarizer and a photo detector, or any other polarization detector having the same or similar characteristics as the aforementioned example.

The device 10 as shown schematically in the drawing FIGURE operates in the following manner. The symmetrical oscillator and locking oscillator are energized simultaneously. The symmetrical oscillator is injection locked by the locking oscillator to a selected frequency and state of polarization. The locking oscillator is then de-energized while the oscillator remains energized in the locked mode. The orientation of the polarized output from the oscillator 12 is then measured by the polarization detector 16. Which is implemented by any number of well known techniques. As the device 10 rotates no force is exerted to change the mode of oscillation so the mode will remain stable in inertial space. There is no force to effect the mode because the oscillator is symmetrical. The output of the polarization detector 16 which rotates with the oscillator 12, indicates the rotation angle.

Numerous other implantations are possible using the same principle discussed above.

While the invention has been particularly shown and described with reference to a preferred embodiment, it will be understood by those skilled in the art that various changes in form and details may be made therein without departing from the spirit and scope of the invention.

What is claimed is:

1. A rotation sensor for measuring the rotational position of a body relative to a fixed inertial coordinate system comprising:
   an electro-magnetic oscillator having symmetry about at least one axes that can be locked into a mode of oscillation corresponding to said fixed inertial coordinate system;
   a locking oscillator for locking said electro-magnetic oscillator into said mode of oscillation corresponding to said fixed inertial coordinate system; and
   a rotation detector for detecting the rotational position of said electro-magnetic oscillator about said symmetrical axes relative to said fixed inertial system.

2. The invention as defined in claim 1 wherein said electro-magnetic oscillator and said locking oscillator comprise laser oscillators.

3. The invention as defined in claim 1 wherein said electro-magnetic oscillator and said locking oscillator comprise maser oscillators.

4. The invention as defined in claim 1 wherein said rotation detector is a polarization detector.

5. The invention as defined in claim 4 wherein said polarization detector is a fixed polarizer and a photo detector.

* * * * *